United States Patent
Patterson et al.

[15] 3,701,385
[45] Oct. 31, 1972

[54] LAND WHEEL CONTROL MEANS

[72] Inventors: Robert Lee Patterson, Fonthill, Ontario; Mario Ventresca, Welland, Ontario, both of Canada

[73] Assignee: Deere & Company, Moline, Ill.

[22] Filed: July 14, 1971

[21] Appl. No.: 162,428

[52] U.S. Cl.....................172/386, 16/35
[51] Int. Cl. ................A01b 15/14, B 60b 33/02
[58] Field of Search............172/284, 286, 288, 383, 385–386, 172/578, 669; 16/35

[56] References Cited

UNITED STATES PATENTS

| | | |
|---|---|---|
| 2,648,270 | 8/1953 | Silver et al..................172/386 |
| 3,324,956 | 6/1967 | Ritchie......................172/386 |
| 3,219,126 | 11/1965 | Lymburner et al........172/286 |
| 2,697,394 | 12/1954 | Fyke..........................172/386 |
| 2,684,618 | 7/1954 | Kelman et al.............172/386 |

*Primary Examiner*—Robert E. Pulfrey
*Assistant Examiner*—C. W. Hanor
*Attorney*—H. Vincent Harsha et al.

[57] ABSTRACT

Apparatus for automatically locking the land wheel of a disk tiller in a preselected transport position in response to movement of the ground-working disks thereon out of engagement with the ground.

9 Claims, 3 Drawing Figures

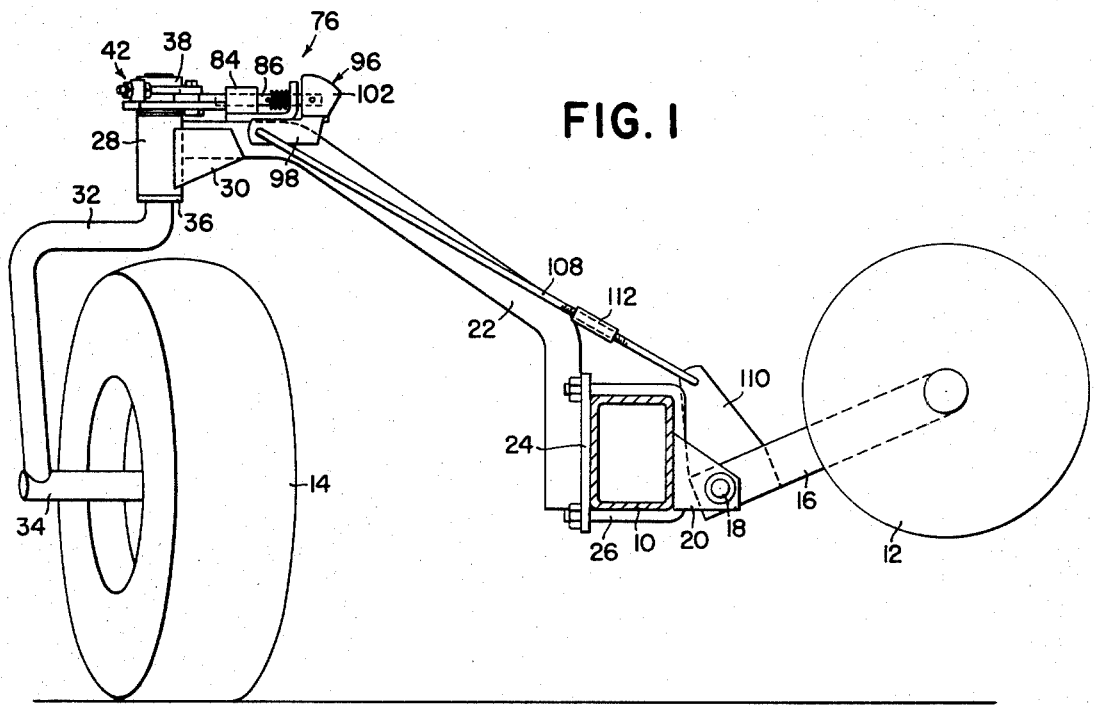
FIG. 1
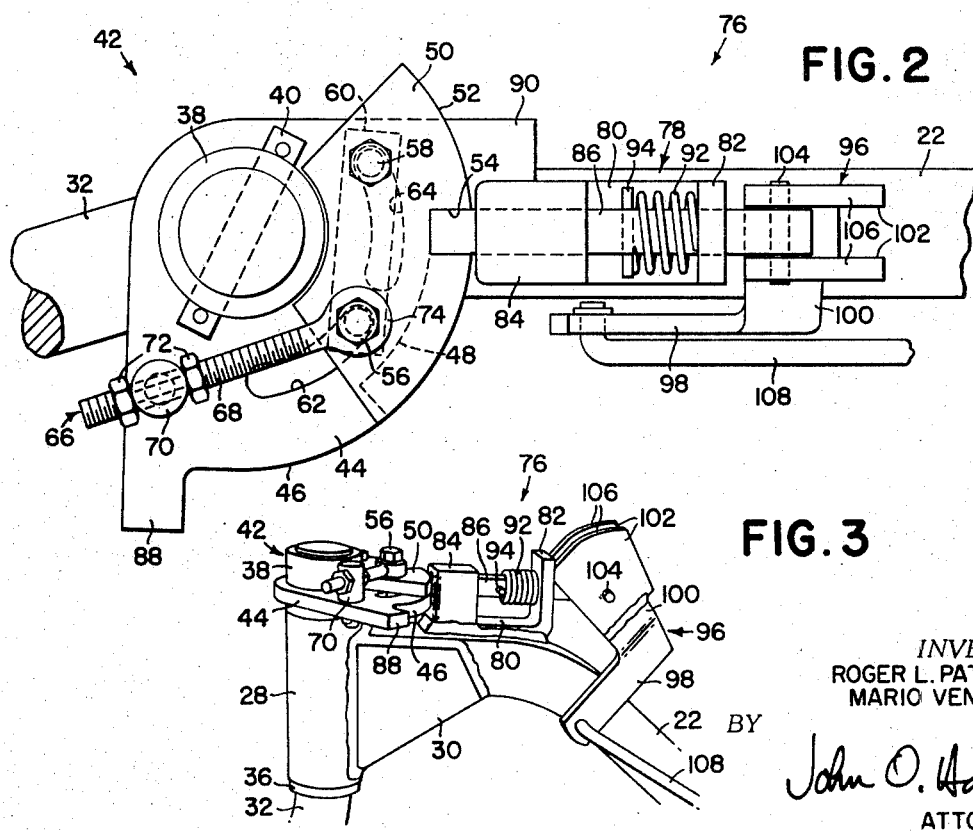
FIG. 2
FIG. 3
INVENTORS
ROGER L. PATTERSON
MARIO VENTRESCA
BY
John O. Hayes
ATTORNEY

LAND WHEEL CONTROL MEANS

BACKGROUND OF THE INVENTION

The present invention relates generally to ground-working agricultural implements, and more particularly to control structure for the land wheel of a disk tiller or the like.

A disk tiller conventionally comprises an elongated frame structure adapted to trail diagonally behind a towing vehicle, the frame having a series of ground-working disks mounted along its rear side for movement into and out of engagement with the ground. The frame is supported relative to the ground by front and rear furrow wheels adapted to travel in furrows left by the disks, and a castoring land wheel mounted forwardly of the outer or rearmost portion of the frame, the land wheel riding on the untilled ground forwardly of the disks. Since implements of this type conventionally have a rather substantial working width, it is common to include provision in their design whereby the implement can be converted to trail in a substantially narrower, endwise manner for transport purposes. One method of converting the implement to such an endwise position includes locking the land wheel in an angled position, and releasing the rear furrow wheel from its relatively fixed operating position and permitting it to castor. The land wheel thus assumes the function of maintaining the directional stability of the tiller during transport. It is desirable, of course, to be able to convert the tiller to its transport position with minimum manual effort.

SUMMARY OF THE INVENTION

Accordingly, it is the primary object of the invention to provide means for automatically controlling the land wheel of a disk tiller or the like, and more particularly to provide means for automatically locking the wheel in a preselected position in preparation for transporting the tiller in an endwise manner.

The invention comprises, generally, a latch member on the tiller frame biased to engage a recess in the land wheel support structure to lock the wheel in its transport position, and a control lever connected to the latch member and movable between operative and inoperative positions, the latch member, in the latter position of the lever, being locked out of engagement with the support structure. The control lever is movable between its alternate positions automatically in response to movement of the ground-working disks on the tiller into and out of engagement with the ground, by means of a link interconnecting the lever with the structure mounting the disks on the tiller frame. When the disks are in their lowered, ground-working position, the control lever, and thus the latch member, is in its inoperative position and the land wheel is free to castor, but as the disks are raised out of engagement with the ground, in preparation for transport of the implement, the lever is moved from its inoperative to its operative position. In the latter position of the lever, the latch member is free to engage the recess in the land wheel support structure and lock the wheel in its transport position. Initial endwise movement of the tiller causes the land wheel to swing from its generally straight-ahead working position to its angled transport position, this movement, in turn, causing the latch-engaging recess in the wheel support structure to come into alignment with and to be engaged by the latch member.

BRIEF DESCRIPTION OF THE DRAWINGS

The preferred embodiment of the invention will be described in conjunction with the accompanying drawings in which:

FIG. 1 is a fragmentary, elevation view of a disk tiller, showing the disks in their raised position and the land wheel locked in its angled transport position;

FIG. 2 is an enlarged plan view of the latch mechanism; and,

FIG. 3 is a perspective view of the latch mechanism, showing the position assumed by the mechanism as the disks are lowered into engagement with the ground.

DESCRIPTION OF THE PREFERRED EMBODIMENT

The disk tiller shown fragmentarily in FIG. 1 includes a box beam main frame member 10 adapted to trail diagonally behind a towing vehicle. A series of dished, soil-working disks 12 (only one being shown) are mounted along the rear side of the member 10 for movement into and out of engagement with the ground. The frame is supported relative to the ground by a pair of furrow wheels (not shown) mounted on the front and rear portions thereof and adapted to ride in the furrows formed by the rearmost disk 12, and by a land wheel 14 adapted to ride on the untilled ground in advance of the frame member 10. The disks 12 are rotatably carried on the ends of a plurality of spaced arms 16, the forward ends of the arms 16 being pivotally connected at 18 to brackets 20 which, in turn, are fixed to the rear wall of the frame member 10. Conventional hydraulic cylinder means (not shown) are employed to swing the arms 16 relative to the frame 10 and thereby raise and lower the disks 12.

The structure mounting the land wheel 14 on the frame comprises a support arm 22 secured to the front side of the member 10 and extending upwardly and forwardly therefrom. A plate 24 connected to the lower end of the arm 22 is held against the front wall of the member 10 by means of U-bolts 26. Rigidly fixed to the forward end of the arm 22 is a cylindrical member 28 having a bore extending vertically therethrough, the connection between the member 28 and arm 20 being reinforced by a brace member 30. The upper cylindrical end portion of a land wheel support arm 32 is received in the bore in the member 28 for pivotal movement about a substantially vertical axis. The wheel 14 is rotatably supported on a horizontal axle member 34 fixed to the lower end of the arm 32, the wheel thus being normally free to castor about the vertical axis of the cylindrical member 28. A flange 36 is provided on the arm 32 to bear against the lower end of the member 28, and a collar 38, secured to the extreme upper end of the arm 32 by means of a pin 40, is engageable with the upper end of the member 28 to retain the arm in the member.

Connected to the collar 38 and thus rotatable with the arm 32 is a latch plate assembly 42 including a first plate member 44 fixed to the periphery of the collar and having an arcuate outer edge portion 46 formed about the vertical axis thereof. An elongated recess, defined in part by an arcuate edge 48 formed about the same axis, is provided along a segment of the edge 46. A second plate member 50 is adjustably mounted on the top side of the plate 44, the member 50 having an outer arcuate edge 52 coinciding with the edge 56 of the plate 44. A recess 54, having a radial dimension substantially equal to that of the recess in the plate 44, is formed in the outer edge of the plate 50 and overlies a portion of the recess in the plate 44. The relative position of the plates 44 and 50 is adjustable so that the recess 54 in the plate 50 can be positioned at any point along the recess in the plate 54. This adjustment is provided by means of bolts 56 and 58 which extend vertically through the plates 44 and 50 and engage threaded apertures in a rectangular member 60 on the underside of the plate 44. When loosened, the bolts 56 and 58 are movable along arcuate, elongated slots 62 and 64, respectively, in the plate 44, the relationship of the various elements being such that when the bolts 56 and 58 are at one of the ends of the slots 62 and 64, the recess 54 in the plate 50 is positioned at one extreme end of the recess in the plate 44 (see FIG. 2), and, conversely, when the bolts are at the opposite ends of the slots, the recess 54 is positioned at the opposite extreme end of the recess in the plate 44. Adjustment of the plate 50 is effected by means of an eyebolt 66 interconnecting the plates 44 and 50, the eyebolt 66 including a threaded end portion 68 extending through a pin 70 pivotally mounted on the plate 44. A pair of nuts 72 are threadably received by the portion 68 and are engageable with opposite sides of the member 70 to adjustably retain the rod 66 therein. The opposite end portion 74 of the rod 66 is connected to the plate 50 by means of the bolt 56. Thus, adjustment of the relative position of the plates 44 and 50, and thereby the position of the respective recesses therein, is accomplished by loosening the bolts 56 and 58, advancing the nuts 72 along the rod 66 to the desired position, and then retightening the bolts 56 and 58.

A latch pin assembly 76, including an axially movable latch pin engageable with the recess 54 in the plate 50, is mounted on the forward end of the arm 22. This assembly comprises, generally, an L-shaped strap 78 having a horizontal portion 80 fixed to the upper surface of the arm 22 and an upright portion 82 formed integrally with and extending vertically from the rearward end of the portion 80, a block 84 fixed to the horizontal portion 80 in spaced relation with the portion 82, and a square latch pin 86 received for axial movement through aligned apertures in the block 84 and portion 82. The block 84 is engageable with a pair of circumferentially spaced projections 88 and 90 on the plate 44, to limit the range through which the wheel 14 can castor. The latch pin 86 is movable axially between operative and inoperative positions, the forward end portion thereof in the former position, being receivable by the recess 54 in the plate 50, as shown best in FIG. 2, to lock the land wheel 14 in a position suitable for endwise transport of the tiller. A coil spring 92 is received by a medial portion of the pin 86 and acts between the front side of the strap upright portion 82 and a stop pin 94 extending transversely through the pin 86 to bias the latter axially forwardly toward the latch plate mechanism 42.

During normal operation of the tiller, the latch pin 86 is held in its inoperative position against the force of the spring 92, out of engagement with the recess 54 in the plate 50, and the wheel 14 is thus free to castor within the range defined by the projections 88 and 90.

A control structure, indicated generally by the numeral 96, functions to hold the pin out of its engaged position and comprises an arm having a vertical, longitudinally extending portion 98 and a horizontal, transversely extending portion 100. A pair of identical, spaced plates 102 are fixed along their lower edges to the horizontal portion 100 and extend on opposite sides of and are pivotally connected by means of a pin 104 to the rear end portion of the latch pin 86. When the control structure 96 is pivoted counterclockwise about the pin 104, as viewed in FIGS. 1 and 3, the upper edges 106 of the plates 102 engage the rear wall of the vertical strap portion 82 and act as cam surfaces to move the latch pin rearwardly against the spring 92 (see FIG. 3). When the forward end of the pin 86 is completely withdrawn from the recess 54, the wheel 14 is free to castor.

According to the invention, the control structure 96 is moved between its operative and inoperative positions corresponding with the same positions of the latch pin 86 and illustrated in FIGS. 2 and 3, respectively, automatically in response to movement of the disks 12 between their raised and lowered positions. As shown best in FIG. 1, the means employed for performing this function of the invention comprises a rod or link 108 interconnecting the forward end of the arm portion 98 with the upper end of a bracket 110 fixed to the disk-carrying arm 16. A turnbuckle 112 is interposed between the end portions of the link 108 to provide for adjustment of the effective length thereof. When the length is properly adjusted, the control structure 96 is in the position illustrated in FIGS. 1 and 2 when the disks 12 are raised to their maximum extent. In this position of the structure 96, as already indicated, the latch pin 86 is free to move forwardly into its operative position and engage the recess 54 in the plate 50, thereby locking the wheel 14 in its transport position. When the disks are then lowered into their ground-engaging position, the control structure 96 is pivoted about the pin 104, the upper edges 106 of the plates 102 engage the rear side of the strap portion 82 causing the latch pin 86 to move rearwardly into its inoperative position and withdraw from the recess 54, and the wheel 14 is thus free to castor.

When the disks 12 are initially raised, in preparation for transport of the implement, the land wheel 14 will normally be in a substantially straight-ahead position and the forward end of the latch pin 86 will thus be biased by the spring 92 against the outer arcuate edge 52 of the plate 50. As the implement is pulled in an endwise manner, however, the wheel 14 will swing around to its angled transport position, whereupon the recess 54 in the plate 50 will come into alignment with the latch pin 86, and the latter will move into engagement therewith. The position of the recess 54 and the plate 50 can be adjusted relative to the plate 44, in the manner already described, to adjust the transport position of the wheel.

We claim:

1. An agricultural implement comprising: frame means; a ground-engaging land wheel; support means rotatably carrying said land wheel and mounted on said frame means for normally free pivotal movement about a generally vertical axis, whereby said land wheel is normally free to castor relative to said frame means; latch means on said frame means movable between operative and inoperative positions, said latch means being operable in the former position to rigidly lock said support means, and thereby said land wheel, in a preselected transport position relative to said frame means; ground-engaging tool means; means mounting said tool means on said frame means, said mounting means being movable vertically between raised and lowered positions, whereby said tool means are movable into and out of engagement with the ground; and means interconnecting said tool mounting means and said latch means for moving said latch means from its inoperative to its operative position in response to movement of said tool mounting means from its lowered to its raised position, whereby said latch means is operable to lock said land wheel in its transport position when said tool means is raised out of engagement with the ground.

2. The invention defined in claim 1 including means associated with said latch means for adjusting the preselected transport position of said land wheel.

3. The invention defined in claim 1 including structure connected to said land wheel support means for movement therewith about said vertical axis, said structure including latch-receiving means; wherein said latch means comprises a member biased to engage said latch-receiving means in said structure; and wherein said means interconnecting said tool mounting means and said latch means is operative to prevent said member from engaging said latch-receiving means in said structure when said mounting means is in its lowered position.

4. The invention defined in claim 3 wherein said structure includes an arcuate surface formed substantially about said vertical axis; and wherein said latch-receiving means comprises a radially inwardly extending recess formed in said arcuate surface.

5. The invention defined in claim 4 wherein said member is biased against said arcuate surface and slidable therealong to said recess when said tool mounting means is in its raised position and said land wheel is moved to its transport position.

6. The invention defined in claim 1 including structure connected to said land wheel support means for movement therewith about said vertical axis, said structure including latch-receiving means; and wherein said latch means comprises a member biased to engage said latch-receiving means in said structure, and control means for said member, said control means being movable between an operative position wherein said member is permitted to engage said latch-receiving means and an inoperative position wherein said member is prevented from engaging said latch-receiving means; and wherein said means interconnecting said tool mounting means and said latch means comprises means interconnecting said tool means and said control means for moving said control means from its inoperative to its operative position in response to movement of said tool mounting means from its lowered to its raised position.

7. The invention defined in claim 6 wherein the position of said latch-receiving means on said structure is adjustable about said vertical axis.

8. The invention defined in claim 6 wherein said control means is pivotally connected to said member and includes a cam surface engageable with said frame, and wherein said control means is rotated about its pivotal connection with said member in response to movement of said tool mounting means between its lowered and raised positions.

9. An agricultural implement comprising: frame means; a ground-engaging wheel mounted on said frame means to normally castor freely about a generally vertical axis; latch means on said frame means movable between operative and inoperative positions, said latch means being operable in the former position to rigidly lock said wheel in a preselected position relative to said frame means; tool means mounted on said frame means for vertical movement; and means interconnecting said tool means and said latch means for moving the latter from its inoperative to its operative position in response to vertical upward movement of the former.

* * * * *